United States Patent Office 3,416,062
Patented Dec. 10, 1968

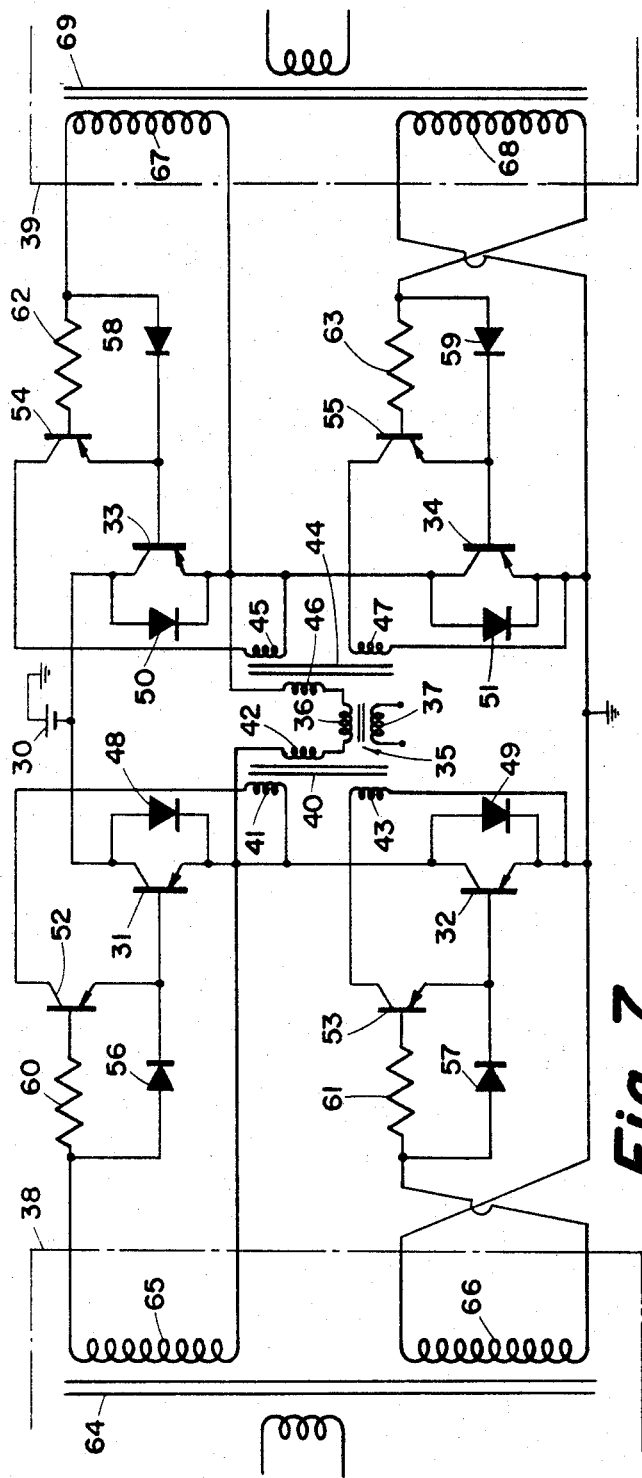
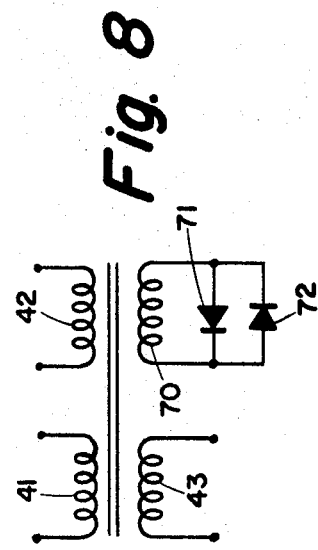
Fig. 7
Fig. 8

3,416,062
DEVICE FOR THE CONVERSION OF A DIRECT CURRENT INTO A SINUSOIDAL ALTERNATING CURRENT
Bo Birger Bernhard, Solna, and Gunnar Axel Kihlberg, Sollentuna, Sweden, assignors to Svenska Ackumulator Aktiebolaget Junger, Stockholm, Sweden, a corporation of Sweden
Filed Nov. 9, 1964, Ser. No. 409,715
Claims priority, application Sweden, Nov. 12, 1963, 12,439/63
6 Claims. (Cl. 321—16)

ABSTRACT OF THE DISCLOSURE

A DC to AC converter utilizing a transistor switching network controlled by two oscillators whose frequency is proportional to their input voltage, which control the transistor network in a manner to produce a two-step stair step output, the fundamental frequency of which is derived from a bypass filter and provided as the input to one of the oscillators to regulate the relative phase displacement between the oscillators in a manner to cause the output voltage to resist change. The converter further includes current control means to bias a given transistor off in the event of reverse current through that transistor, which control means is further rendered ineffective through gate means under control of the oscillators. The converter further includes differentiating means in circuit between the transistors to maintain the relative phase displacement in the network between two preset limits.

---

The present invention refers to an arrangement for the conversion of a DC voltage into a sinusoidal AC voltage of the type having a switching network comprising two single-pole double-throw switches, in which arrangement the fixed contacts of one of the switches are connected to the corresponding fixed contacts of the other switch, and DC voltage is fed to the connected contacts. Upon sequential operation of the switching network, a symmetrical two-step stairstep AC voltage results between the switch arms of the switches, which is fed to the input of a bandpass filter that is tuned to the fundamental frequency of the AC voltage, the output of which is the output of the converter. The switches are arranged to be controlled by two oscillators of a known type which have the property of giving an oscillator frequency proportional to their input voltage. The output voltage of the converter is fed to a rectifier followed by a smoothening filter, the output of which is arranged to feed one of the two oscillators. The other oscillator is fed by a reference voltage.

Arrangements for the conversion of a direct voltage into a sinusoidal AC voltage are previously known, but they frequently have the drawback that, if the efficiency is high, the content of harmonics is also high; and, if the content of harmonics is low, the efficiency is also low. Further, previously known stabilized converters give an output voltage which has an error in relation to the desired magnitude which theoretically differs from zero. Also, previously known converters which have a high efficiency and a low content of harmonics demonstrate poor stabilization and utilize a great number of components.

The arrangement according to the present invention combines a high efficiency, a low content of harmonics and a good stabilization. The divergence of the output voltage from the desired value is theoretically zero. In addition, the arrangement comprises a moderate number of components.

Accordingly, it is an object of this invention to provide a device for converting a DC voltage into an AC voltage.

It is a further object of this invention to provide a DC to AC converter having a high efficiency and utilizing a relatively small number of components.

It is another object of this invention to provide a DC to AC converter which demonstrates a high degree of stabilization.

It is yet another object of this invention to provide a device for converting a DC voltage into a sinusoidal AC voltage having a low content of harmonics.

Other objects and advantages of the present invention may be seen from a reading of the following description taken with the drawings in which:

FIG. 7 shows how the transistor arrangement of FIG. 6 is completed by gates and current transformers for controlling the transistors.

FIG. 8 shows one of the current transformers of FIG. 7 which has been completed with an over-voltage protection.

FIG. 1 shows how a symmetrical two-step stairstep voltage is conceivably derived from two square-wave voltages A and B. The conversion of a DC voltage into a symmetrical two-step stairstep voltage may be achieved mainly in two different ways.

Figure 1:
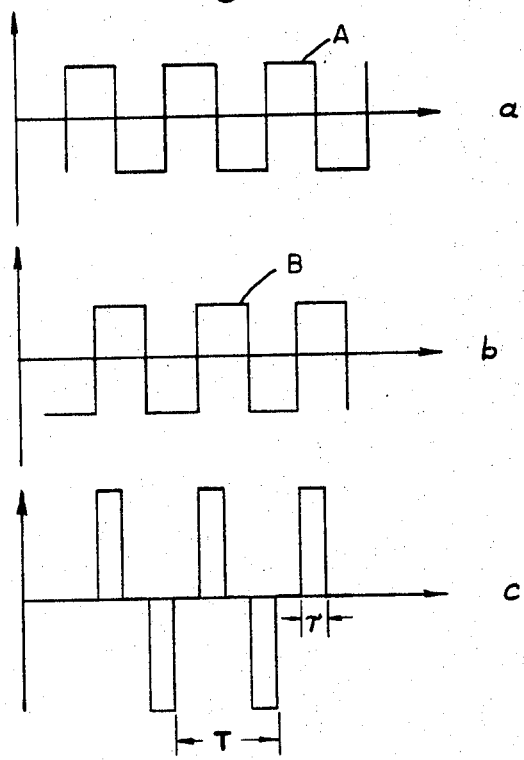
FIG. 1 shows how two square-wave voltages are put together to form a symmetrical two-step stairstep voltage.
Figure 2:
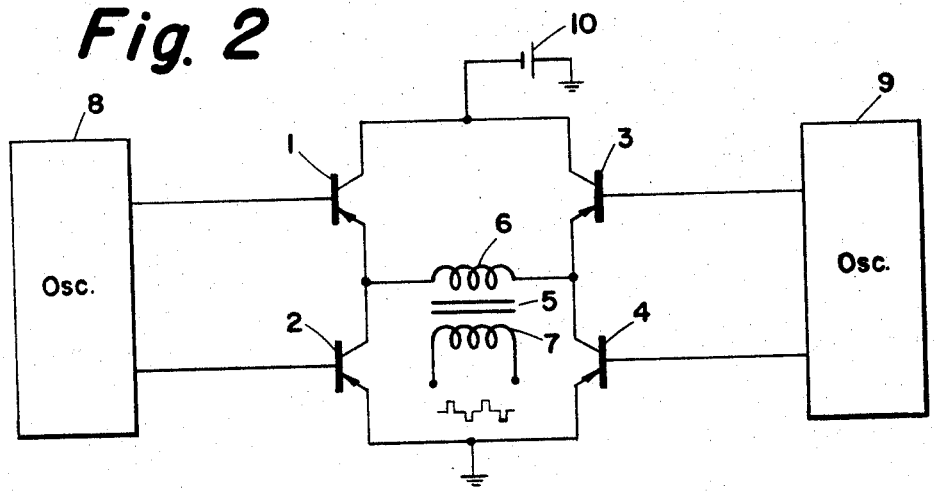
FIG. 2 is a wiring diagram showing one way to arrange transistors in order to obtain a symmetrical two-step stairstep voltage.

A first way is by the arrangement of FIG. 2 where four suitably controlled transistors 1–4 form a switching network to appropriately direct current through the primary winding 6 of a transformer 5 in such a sequence that the voltage across the secondary winding 7 of the said transformer will have an appearance according to FIG. 1(c). Transistors 1 and 2 form a single-pole double-throw switch which is controlled by an oscillator 8, and transistors 3 and 4 form another single-pole double-throw switch which is controlled by an oscillator 9.

A complete operating cycle of the arrangement of FIG. 2 can be divided into four intervals. In the first interval it is assumed that oscillators 8 and 9 are in such a relative phase relationship that transistors 1 and 4 are conducting and transistors 2 and 3 are cut off. Transistors 1 and 2 are never conducting or cut off at the same time; nor are transistors 3 and 4 conducting or cut off at the same time. The current from a battery 10 passes transistor 4, transformer winding 6 and transistor 1. Current in this path will continue to increase throughout the first interval, and the voltage induced in secondary transformer winding 7 will thus have a maximum positive value for the duration of the first interval. To indicate the second interval, the voltage from oscillator 8 reverses its polarity so that transistor 1 is now cut off and transistor 2 is now conducting. Thus, in the second interval transistors 1 and 3 are cut off, transistors 2 and 4 are conducting, and the current from the battery is cut off. The current in the transformer winding 6 may continue to flow through transistors 2 and 4. By this means voltage-rises that are detrimental to the transistors are prevented from developing in the circuit, among other things. Thus, during the second interval the voltage across winding 7 is zero.

The third interval is initiated when the voltage from oscillator 9 changes to opposite polarity so that transistor 3 will conduct and transistor 4 is cut off. Thus, during the third interval transistors 2 and 3 are conducting and transistors 1 and 4 are cut off, and current will flow through transistor 2, winding 6 and transistor 3, i.e., in a direction in winding 6 opposite to that of the first interval. The voltage across winding 7 during the third interval will have a maximum value of opposite polarity to that of the first interval.

The fourth interval is initiated when the output voltage from oscillator 8 changes polarity. Thus, the fourth interval is characterized by transistors 1 and 3 conducting and transistors 2 and 4 cut off. The current from battery 10 is also cut off. As in the second interval, the current induced in winding 6 may continue to flow through transistors 1 and 3.

It will be observed that in the second and fourth intervals one transistor will be traversed by current in a reverse direction.

Figure 3:
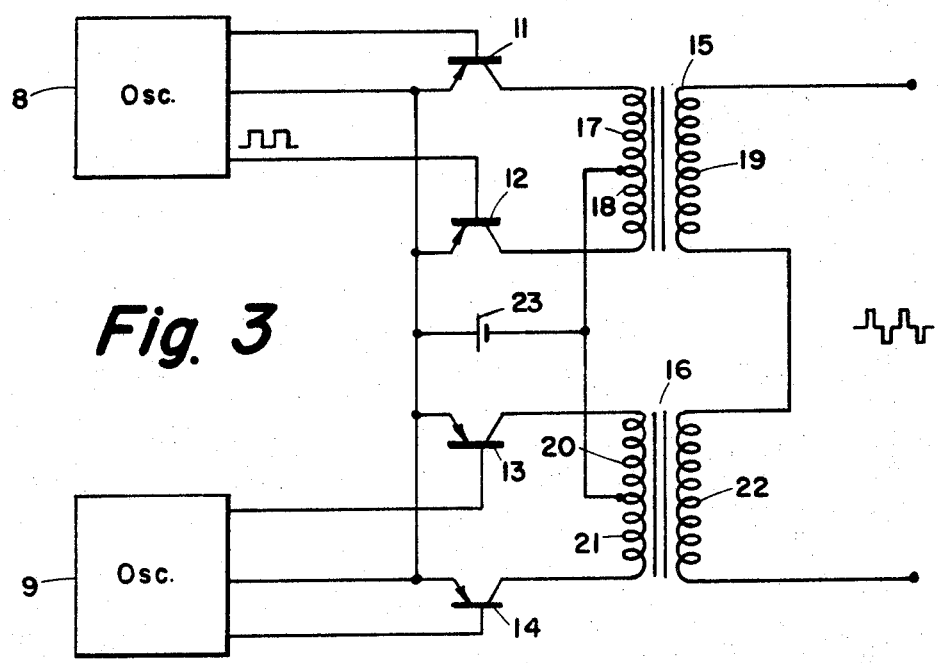
FIG. 3 shows an alternative of the arrangement of FIG. 2.

Another way of producing a symmetrical two-step stairstep voltage is that shown in the arrangement according to FIG. 3 where four transistors 11–14 control the current through the primary windings 17–18 and 20–21 of two transformers 15 and 16 respectively. The secondary windings 19 and 22 of these transformers are connected in serise. The resulting voltage will have a wave-form according to FIG. 1(c). As in the device of FIG. 2, the device of FIG. 3 has a working cycle which can be divided into four intervals.

During the first interval it is assumed that transistors 11 and 13 are conducting and transistors 12 and 14 are cut off. The current from the battery will then flow partly through transistor 11 and primary winding 17 of transformer 15, and partly through transistor 13 and primary winding 20 of transformer 16. The voltages across secondary windings 19 and 22 of the transformer are now of equal magnitude and of the same polarity, and consequently the output voltage, being the sum of the voltages across secondary windings 19 and 22, will have a positive maximum value.

To initiate the second interval, oscillator 8 will change polarity at which transistor 11 will be cut off and transistor 12 will be conducting. The current from battery 23 will then flow partly through transistor 12 and winding 18, and partly through transistor 13 and winding 20. The voltage across winding 19 will now have a maximum value of opposite polarity relative to that of the first interval and relative to the voltage across winding 22. Thus, the output voltage will be zero. If the converter load is such that the current through the secondary windings 19 and 22 will continue to flow in the same direction, this will be possible without any rise of the voltage, for current can circulate in the circuit constituted by windings 18 and 20 and transistors 12 and 13, as transistors 12 and 13 are conducting. Also, one of the transistors will be traversed by current in the reverse direction.

The third interval is intiated when oscillator 9 changes polarity, during which transistors 12 and 14 are conducting and transistors 11 and 13 are cut off. The output voltage will now have a maximum value of opposite polarity to that of the first interval.

The fourth interval is initiated when oscillator 8 changes polarity, during which transistors 11 and 14 are conducting and transistors 12 and 13 are cut off. If the converter load is such that the current continues to flow in the same direction as during the second interval, windings 17 and 21 and transistors 11 and 14 will constitute a path for a circulating current. Also, one of the transistors will be traversed by current in the reverse direction.

In both of the embodiments of FIGS. 2 and 3 described above, if the converter load is of such a nature that the current is out of phase with the output voltage, energy will be fed back to the battery at which two of the transistors always will be traversed by current in their reverse direction.

Figure 4:
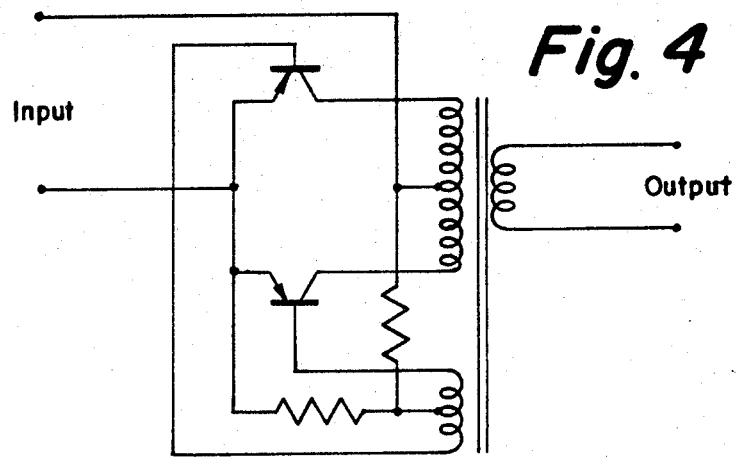
FIG. 4 shows the construction of an oscillator element of the converter according to the invention.

In both the devices of FIGS. 2 and 3, the transistors are controlled in pairs by two similar oscillators shown in FIG. 4 and of a known type (e.g., a transistor-saturable reactor oscillator or multivibrator). The input voltage to one of the oscillators is from a reference source while the input voltage to the second oscillator is the rectified and filter-output voltage of the converter.

The shape, RMS value and content of harmonics of the symmetrical two-step stairstep output voltage depends on the phase difference between the oscillators. By means of varying the value $\tau$ (see FIG. 1(c)), it is possible to eliminate any one of the harmonics, for the $n^{\text{th}}$ tone is eliminated when $\tau = T/n$, where T is the period of the stairstep waveform. At constant load and battery voltage, the converter can be dimensioned such that the output voltage has a required RMS value when $\tau = T/3$, for the third harmonic will then disappear, which simplifies the filtering. At greatly varying load and battery voltage, the output voltage can be adjusted by controlling $\tau/T$, i.e., by controlling the mutual phase displacement of the oscillators.

Figure 5:
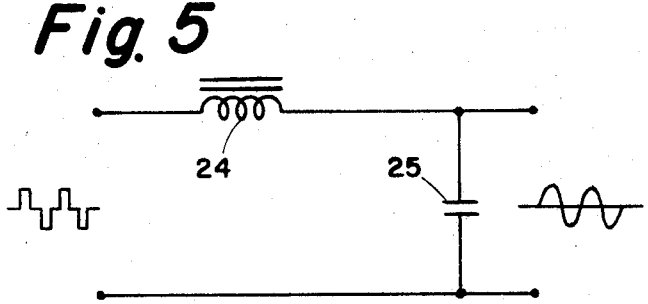
FIG. 5 shows a series resonant circuit which is used for the filtering of the symmetrical two-step stairstep voltage to produce a sinusoidal output voltage.

Filtering of the output of the switching network is accomplished by means of a series resonnace circuit with inputs and outputs according to FIG. 5. The circuit is tuned to the fundamental frequency of the symmetrical two-step stairstep output voltage. By this means the output impedance would be very high if there had been no feedback. An alternative circuit may be made with the inductance connected in series with the primary winding 36, FIG. 7, of the output transformer of the transistor arrangement.

One of the oscillators is driven by a stabilized reference voltage whereas the other is driven by the output voltage which has been rectified and filtered in a suitable way. The transformers of the oscillators have cores, the magnetization curve of which has a pronounced knee. Since in operation the transformers of the oscillators are always driven to saturation, the oscillator frequency will be proportional to the feed voltage with a fair approximation. This feature is previously known and is utilized for the introduction of an integration in the closed loop whereby static errors as to the magnitude of the output voltage will be theoretically eliminated. The integration results since the phase difference between the oscillators controls the magnitude of the output voltage and the magnitude of the output voltage in turn controls the frequency of one of the oscillators.

The tuned circuit, which constitutes a bandpass filter for the alternating current, will act as a simple delay or as a low-pass filter for the magnitude of the alternating voltage, considered as the signal in the closed loop. This is clearly evident from the fact that the closed loop may be regarded as a carrier frequency system in which the alternating voltage is the carrier frequency voltage and its amplitude is the signal.

Figure 6:
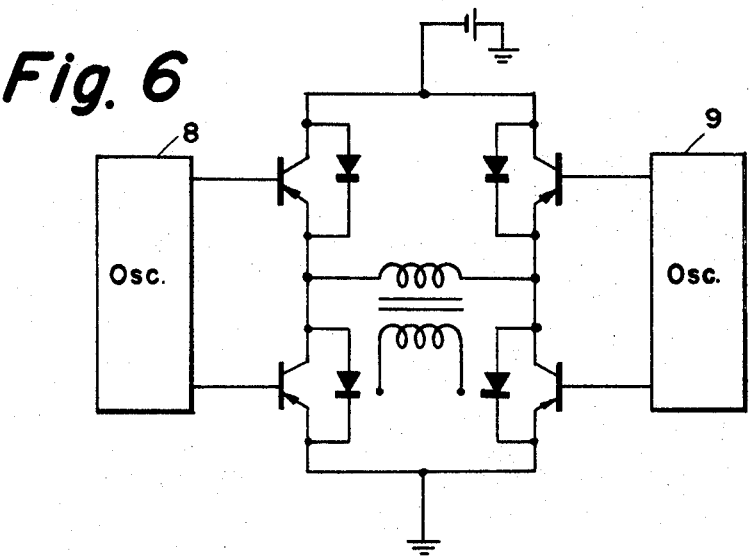
FIG. 6 shows how the transistor arrangement of FIG. 2 may be completed by diodes which are connected in parallel with the transistors.

A decrease of the power loss in the transistors and a decreased demand for the base drive current when current is flowing in the reverse direction is obtained by connecting a diode in parallel across each transistor between the emitter and the collector, arranged in the same direction as the collector-base diode of the transistor. This arrangement is shown in FIG. 6. By means of this connection the transistor can be kept cut off even during the intervals when a current flows in the reverse direction whereby the total of this current will pass through the diode.

FIG. 7 shows a special system for controlling the transistors of the switching network of FIG. 2 or FIG. 3 which considerably differs from the simple cases discussed where the transistors are controlled directly by the two oscillators. The special system is characterized in that the current through the primary winding 36 of the output transformer 35 is passed through primary windings 42 and 46 of two current transformers 40 and 44, and that the current through the secondary windings 41, 43, 45, 47 of these is utilized for controlling transistors 31–34 via gates which are constituted by transistors 52–55, which in turn are controlled by oscillators 38 and 39 via resistors 60–63. Also, diodes 56–59 are connected to the same ends of the secondary windings 65–68 of the oscillator transformers as are resistors 60–63. The cathodes 56–59 are connected to the bases of transistors 31–34. The opposite ends of the secondary windings of the oscillator transformers are connected to the respective emitters of the transistors. One end of each of secondary windings 41, 43, 45 and 47 of current transformers 40 and 44 is also connected to respective emitters. These secondary windings of the current transformers are here arranged such that if windings 41 and 47 have an induced voltage of such polarity that they endeavor to bring transistors 31 and 34 to conduction, windings 43 and 45 will present cut-off voltages to transistors 32 and 33, and vice versa.

FIG. 8 shows an arrangement which can be made on the transformer windings of the switching network to prevent voltages from increasing to unpermissible values in cases when the load impedance to the secondary windings is high. This arrangement is shown on the current transformer 40 of FIG. 7, and consists of an extra secondary winding 70 to which two oppositely poled diodes 71 and 72 are arranged in parallel. When the voltage across this winding has reached the knee voltage of the diodes, they will start to conduct and thereby prevent a further increase of the voltage. The transformer ratio has been chosen such that the voltages across secondary windings 41 and 43 will be of a suitable magnitude for the driving of transistors 31 and 32, FIG. 7. On cutting off, these transistors have a comparatively high impedance between base and emitter which will cause the above described voltage limiter to function.

Several advantages have been gained by the control system of FIG. 7. Transistors 31–34 have a bias which is proportional to the current drained from the converter, and therefore the base losses in these transistors will not be greater than what is needed with regard to the drained current. This will improve the efficiency. Further, such a state is prevented from developing in which two transistors, e.g., 31 and 32 in FIG. 7, will be conducting at the same time. Such a state may develop in connection with conventional controlling, as during the switching process proper, transistor 31 may start conducting before transistor 32 is cut off, which will result in a powerful current peak which leads to heating or destruction of the transistors. Further, the transistors are kept cut off at a time during which the current in a particular transistor tends to flow in the reverse direction, in which case the total current is forced to pass through diodes 48–51 connected in parallel with the transistors. Thus, heating of the transistors is prevented and the load on the oscillators will be considerably decreased.

The working cycle of FIG. 7 can be divided into four intervals. During the first interval it is assumed that transistors 31 and 34 are conducting and transistors 32 and 33 are cut off. In the secondary windings 65 and 68 of oscillator transformers 64 and 69 in oscillators 38 and 39, a voltage of such a direction will be induced that the ends of the windings which are connected to resistor 60 and diode 56 and resistor 63 and diode 59 respectively will be negative. Thus transistors 52 and 55 will conduct. The bias current to transistor 52 will pass winding 65, the base-emitter junctions of transistors 31 and 52 and resistor 60. The bias current to transistor 55 will pass winding 68, the base-emitter junctions of transistors 34 and 55 and resistor 63.

If, at this time, current through primary windings 42 and 46 of current transformers 40 and 44 has such a direction that transistors 31 and 34 are traversed by current in the normal direction, the currents in secondary windings 41 and 47 of the current transformers will be in such a direction that they keep transistors 31 and 34 conducting. The bias currents to transistors 31 and 34 will then flow through winding 41, the emitter-base junction of transistor 31 and the emitter-collector junction of transistor 52, and winding 47, the emitter-base junction of transistor 34 and the emitter-collector junction of transistor 55 respectively.

If, on the other hand, the current through the primary windings of the current transformers has such a direction that transistors 31 and 34 would be traversed by current in the reverse direction, then the currents through secondary windings 41 and 47 of the current transformers would be in such a direction that they would cut off transistors 31 and 34. Therefore, diodes 48 and 51, which are connected in parallel to these transistors, will take over the current which, consequently, can still flow through the primary windings of the current transformers, and thus on the one hand feed energy back to battery 30, and on the other hand keep transistors 31 and 34 cut off. Transistors 52 and 55 will then be traversed in their reverse direction, but with a very weak current which will serve to keep transistors 31 and 34 cut off. Therefore, the base current demand for transistors 52 and 55 will be reasonable.

Transistors 31–34 are thus controlled by the oscillators as well as by the curernt through the transistors in such a way that a signal cutting off a transistor will always "win" over a signal turning on the transistor.

The second interval is initiated when oscillator 38 reverses polarity. Transistor 52 will now be cut off via resistor 60 which connects the base of the said transistor to the positive end of winding 65. In addition, this end will be connected via diode 56 to the base of transistor 31 so that this transistor will be cut off. The voltage across winding 65 is sufficiently high so that transistors 31 and 52 will both be cut off, irrespective of what polarity the voltage across the secondary winding 41 of current transformer 30 happens to have, i.e., irrespective of what direction the current through the transformers has during this interval. Transistor 53 will also be conducting since its base is connected via resistor 61 to the end of winding 56 which is negative during this interval. Depending on the direction of the current through the transformers. transistor 32 will now be conducting or cut off.

If it is assumed that the current through the transformer of FIG. 7 has such a direction during the second interval that transistor 32 will be conducting, i.e., a direction opposite to that of the first interval, then the current will circulate through transistor 32, primary windings 42, 36, 46 of transformers 40, 35, 44 and diode 51, for transistor 34 is then cut off due to the current direction through the current transformer. If, on the other hand, the current continues in the same direction as in the first interval, transistor 32 will remain cut off, whereas transistor 34 will remain conducting, and therefore the current will circulate through diode 49, transistor 34 and primary windings 46, 36 and 42 of transformers 44, 35 and 40.

When oscillator 39 changes polarity the third interval is initiated. Oscillators 38 and 39 will be biasing transistors 32 and 33 on. However, these transistors will conduct only if the current through the primary windings of the transformer 36 is in such a direction that the current through the secondary windings 45 and 43 of transformers 44 and 40 is also biasing transistors 32 and 33 to their conducting state. The current through primary windings 42, 36 and 46 of the transformers will now flow through transistors 33 and 32. If the current in transformer 35 changes direction during this interval, transistors 32 and 33 will be cut off and the current will then flow through diode 50, transformer windings 46, 36 and 42 and diode 49. Energy is then fed back to the battery.

When oscillator 38 again changes polarity, the fourth interval is initiated which is characterized in that the current in the normal direction passes through diode 48, windings 42, 36 and 46 and transistor 33. Transistor 31 is kept cut off by the function of current transformer 41, whereas transistor 32 and 34 are kept cut off directly by the oscillators. If the current has a direction opposite the normal direction during this interval, transistor 33 will be cut off and transistor 31 conducting whereby the current will flow through diode 50, windings 46, 36 and 42 and transistor 31.

As has been mentioned previously, the closed loop of the converter contains a pure integration, seen from an automatic feedback control viewpoint. In order to prevent self-oscillations from occurring as a result of strong disturbances due to instantaneous changes of the load, the range must be limited within which the integrated signal may vary. This is known from the automatic feedback control technique.

Figure 9:
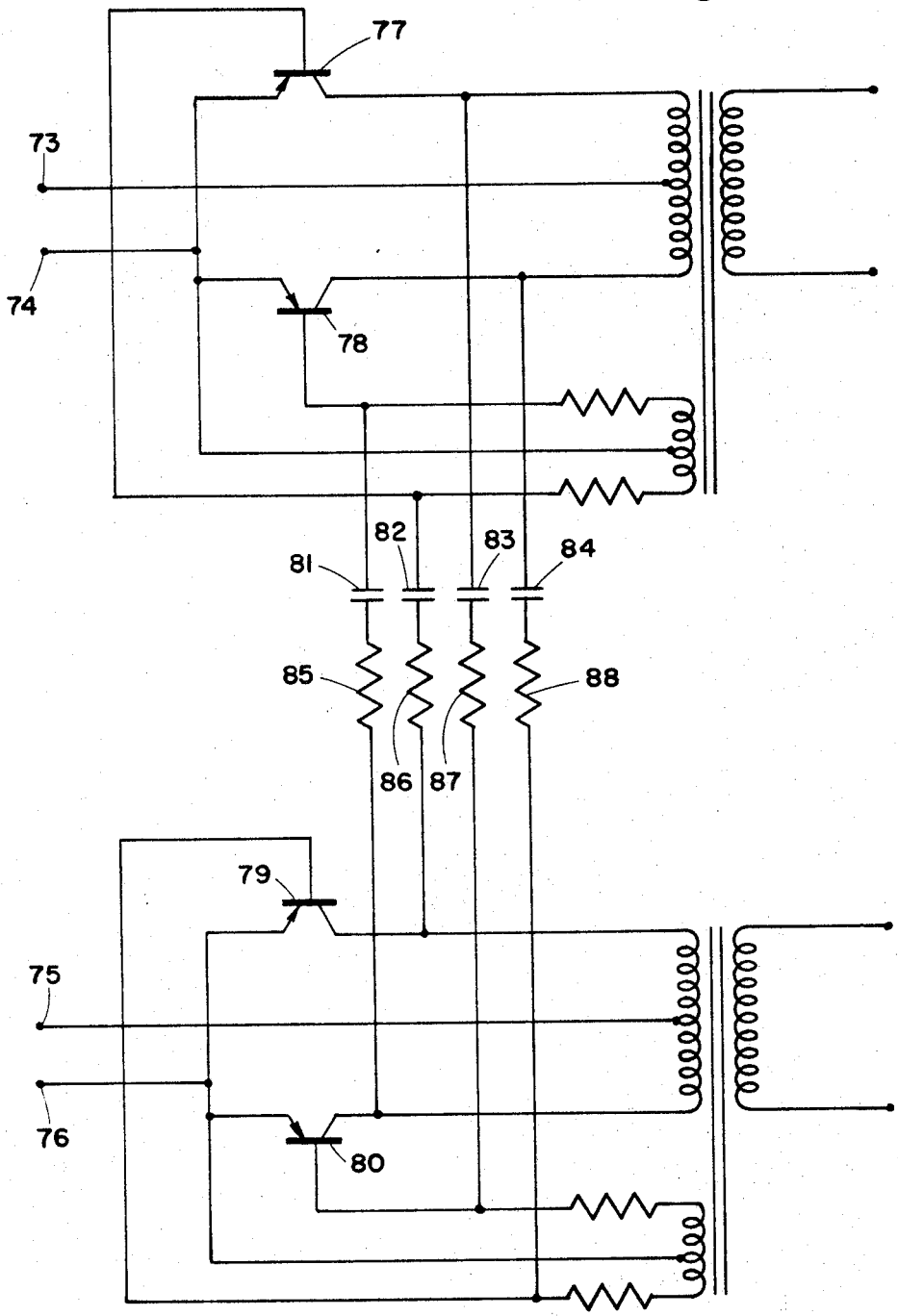
FIG. 9 shows two oscillators provided with circuits for establishing a limitation on their relative phase displacement.
Figure 10:
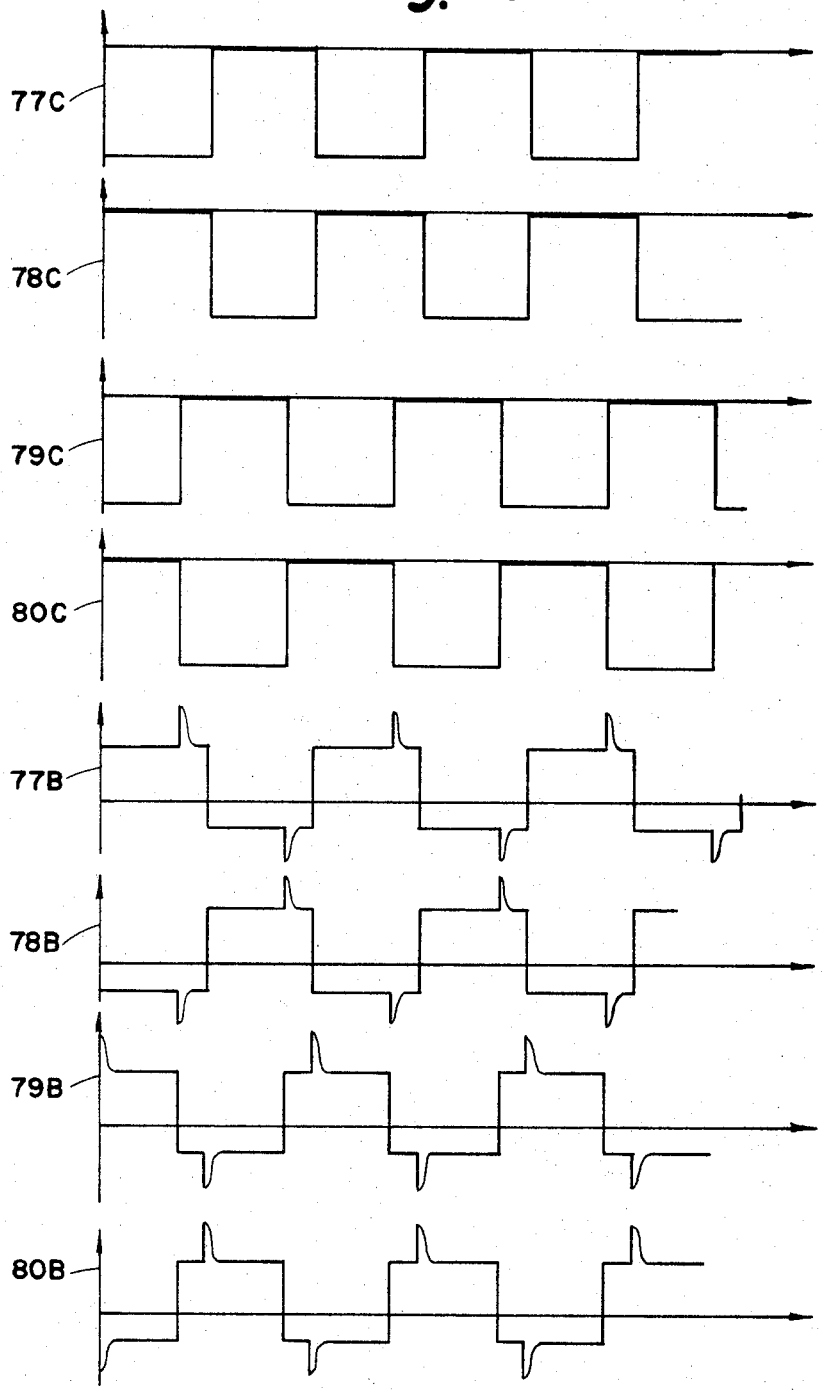
FIG. 10 shows diagrammatically the voltages of the bases and collectors of the transistors of the circuit of FIG. 9.

In the converter, the feedback signal represents the magnitude of the output voltage. When the magnitude of the output voltage controls the frequency of one of the oscillators, the phase difference between the oscillators will consequently represent the integral of the signal. By limiting the range of phase difference between the oscillators, one can consequently make the converter stable even when powerful disturbances occur. It will now be described how this limitation is performed in a case when the limits chosen are 0 and 180°. FIG. 9 shows the oscillators provided with the extra circuits which govern the limitation of the phase difference. FIG. 10 shows the voltages of the bases and collectors of transistors 77–80 as functions of time. Numerals 77C–80C of FIG. 10 indicate the voltage of the collectors of transistors 77–80 of FIG. 9, and numerals 77B–80B of FIG. 10 indicate the voltages of the bases of transistors 77–80 of FIG. 9.

The collector voltages are differentiated by means of capacitors 81–84, at which the changes in a certain collector voltage appear in the shape of pulses on the base of the transistor, to the base of which the said collector voltage has been connected via a resistor and a capacitor. Capacitors 81–84 mainly determine the width of the pulses whereas resistors 85–88 mainly determine the height. The values of the said capacitors and resistors are adjusted such as to give a safe function without the pulses becoming so high as to damage the transistors.

As long as the phase difference between the oscillators is within the allowed interval every positive pulse, i.e. "cut-off pulse," on the base of a transistor will appear when the base voltage is positive, whereas every negative pulse, i.e. "conduct pulse," will appear when the base voltage is negative. This means that the pulses have no effect, for the cut-off pulses will occur when the transistor in question is already cut off and the conduct pulses when it is already conducting. If, on the other hand, the phase difference between the oscillators should change so much that a certain transistor would tend to be conducting when a cut-off pulse arrives, then the cut-off condition will always takes place when the cut-off pulse arrives. In a corresponding way, changes to the conducting condition always will take place when a coduct pulse occurs. This way the phase difference between the oscillators in the embodiment shown in FIGS. 9 and 10 will always remain between 0 and 180°, including the limits.

Figure 11:
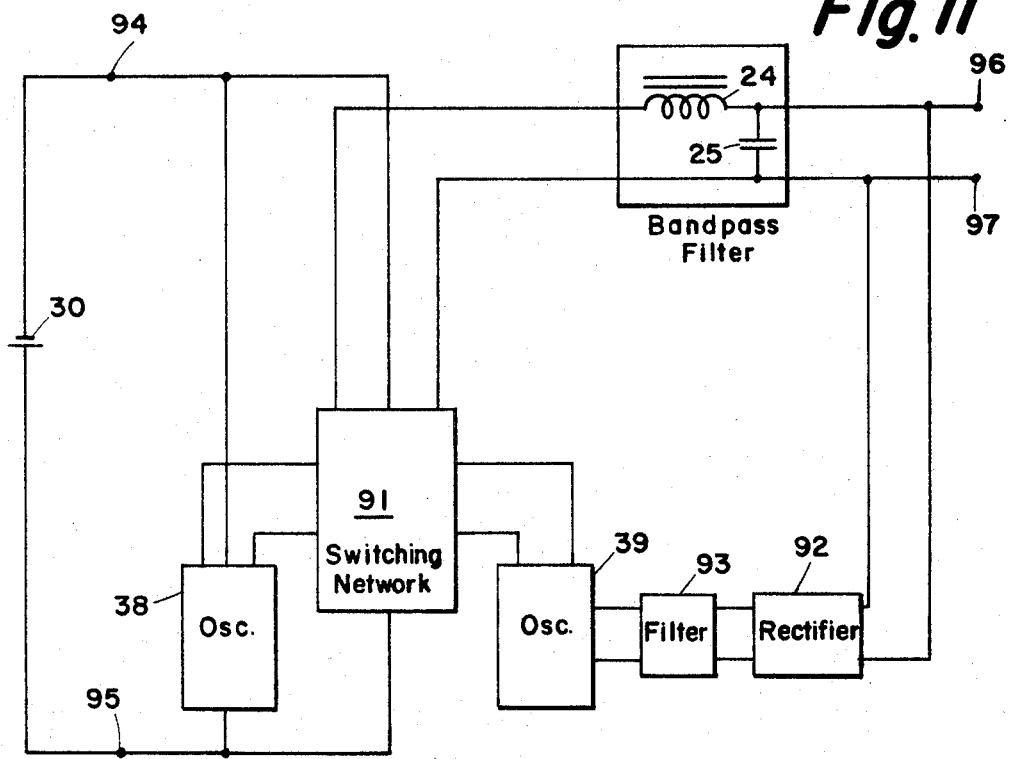
FIG. 11 shows the complete converter in the form of a block diagram.

In FIG. 11, a complete converter is shown partly in the form of a block circuit diagram in which block 91 is a switching network and contains the arrangement shown in FIG. 7, but without transformers 64 and 69 of FIG. 7 which are included in oscillators 38 and 39. Numerals 92 and 93 indicate a rectifier and a filter respectively. Numerals 94 and 95 indicate the input poles of the converter and numerals 96 and 97 indicate the output poles for the sinusoidal alternating current output. Inductor 24 and capacitor 25 comprises a bandpass filter.

In the above description it has been presumed throughout that PNP transistors have been utilized. It is obvious that the invention is not limited to such embodiments but includes embodiments in which NPN transistors are utilized, in which case all of the diodes change direction, and the polarity of the voltage source is changed.

While several specific embodiments of the present invention have been described, it will be obvious to one of ordinary skill in the art that various changes may be made to the apparatus without departing from the scope of the invention.

Having fully described and illustrated the present invention, what we desire to claim is:

1. A device for converting DC voltage to a sinusoidal AC voltage, comprising the following means in combination, a first oscillator being supplied with a stabilized reference DC voltage to provide an output signal of quasi-square wave AC voltage with a reference frequency proportional to the magnitude of said reference DC voltage, a second oscillator being supplied with a DC voltage corresponding to said sinusoidal AC voltage to provide an output signal of quasi-square wave AC voltage with a frequency proportional to the magnitude of said DC voltage supplied thereto, switching network means being supplied from a DC source and including transistors triggered by said output signals from said first and second oscillators, thereby providing a symmetrical two-step stairstep output AC voltage, the effective value of which is dependent upon the relative phase displacement between the output signals from said first and second oscillators, filtering means for deriving the fundamental frequency from said stairstep output AC voltage, thereby providing a sinusoidal AC output voltage of low content of harmonics for application to a load, and rectifying and filtering means forming said DC voltage from said sinusoidal AC voltage for the supply of said second oscillator, said first and second oscillators together with said switching network means and said rectifying and filtering means forming an integrating circuit in which changes in said sinusoidal AC voltage will result in instant correction of the frequency of said second oscillator, thereby changing the relative phase displacement between the output signals from said first and second oscillators in a manner to cause said sinusoidal voltage to remain unaltered.

2. A device according to claim 1 including resistance-capacitance means intercoupling said two oscillators and providing differentiating means limiting the relative phase displacement between said two oscillators.

3. A device for converting DC voltage to a sinusoidal AC voltage, comprising the following means in combination, a first oscillator being supplied with a stabilized reference DC voltage to provide an output signal of quasi-square wave AC voltage with a reference frequency proportional to the magnitude of said reference DC voltage, a second oscillator being supplied with a DC voltage corresponding to said sinusoidal AC voltage to provide an output signal of quasi-square wave AC voltage with a frequency proportional to the magnitude of said DC voltage supplied thereto, switching network means being supplied from a DC source and including transistors triggered by said output signals from said first and second oscillators, thereby providing a symmetrical two-step stairstep output AC voltage, the effective value of which is dependent upon the relative phase displacement between the output signals from said first and second oscillators, filtering means for deriving the fundamental frequency from said stairstep output AC voltage, thereby providing a sinusoidal AC output voltage of low content of harmonics for application to a load, rectifying and filtering means forming said DC voltage from said sinusoidal AC voltage for the supply of said second oscillator, said first and second oscillators together with said switching network means and said rectifying and filtering means forming an integrating circuit in which changes in said sinusoidal AC voltage will result in instant correction of the frequency of said second oscillator, thereby changing the relative phase displacement between the output signals from said first and second oscillators in a manner to cause said sinusoidal voltage to remain unaltered, and said switching network means including a current transformer having a primary winding in circuit with said source of DC voltage, a secondary winding determining the output for said load, and two diodes of opposite polarity relative to each other connected in parallel with said secondary winding to provide a voltage limiter for the device.

4. In a system for converting a DC current to a sinusoidal alternating current, the combination comprising:

switching network means providing output for a load, a first oscillator having a frequency proportional to the input voltage applied thereto and connected as a first input signal to said switching network means, a second oscillator having a frequency proportional to the input voltage applied thereto and connected as a second input signal to said switching network means, a source of direct current potential connected as a power source for said switching network means and as the input voltage to said first oscillator to thereby operate said first oscillator at a reference frequency, said switching network means providing a symmetrical two-step stairstep output voltage in response to and in proportion to the relative phase displacement of said first and second oscillators, a bandpass filter having an input and an output and tuned to the fundamental frequency of said stairstep output voltage, said input of said bandpass filter connected to said stairstep output voltage of said switching network means and said output of said bandpass filter providing for the system a sinusoidal output voltage having a low content of harmonics, a rectifier and filter circuit having an input and an output, said input of said rectifier and filter circuit connected to said output of said bandpass filter and said output of said rectifier and filter circuit providing the input voltage to said second oscillator, thereby regulating said relative phase displacement in response to a change in said output voltage in a manner to cause said output voltage to resist change, and said switching network means including a current transformer having a primary winding connected in circuit with said source of direct current potential, a secondary winding determining the output for said load, and two diodes of opposite polarity relative to each other connected in parallel with said secondary winding to provide a voltage limiter for the system.

5. In a device for converting a DC input to an alternating current output, the combination compising:

switching network means including transistors, a source of direct current potential connected through said network means and providing an output for a load, a first oscillator including two transistors and having a frequency proportional to the input voltage thereto, said source of direct current potential providing the input voltage to said first oscillator to provide a reference frequency, a second oscillator including two transistors and having a frequency proportional to the input voltage thereto, said first oscillator and said second oscillator being connected in the base circuits of said transistors to selectively render each of said network transistors conductive in a manner to provide said output with an alternating current output, the magnitude of which is poportional to the relative phase displacement of said oscillators, said output being connected as the input to said second oscillator in a manner to regulate the relative phase displacement of said oscillators to cause said output to resist change, and means for maintaining the relative phase displacement between said first and second oscillators between two preset limits including differentiating means selectively interconnecting the collector circuits and base circuits of said transistors of the oscillators.

6. In a system for converting a DC input to an alternating current output, the combination comprising:

switching network means, a source of direct current potential connected through said network means and providing an output for a load, said switching network means including four transistors connected in circuit with said source of direct current potential, a first oscillator having a frequency proportional to the input voltage thereto, said source of direct current potential providing the input voltage to said first oscillator to provide a reference frequency, a second oscillator having a frequency proportional to the input voltage thereto, said first oscillator and said second oscillator being connected to the base circuits of said transistors to selectively render each of said transistors conductive in a manner to provide said output with an alternating current output, the magnitude of which is proportional to the relative phase displacement of said oscillators, said output being connected as the input to said second oscillator in a manner to regulate the relative phase displacement of said oscillators to cause said output to resist change, current control means connected in the base circuits of said transistors and responsive to the magnitude and direction of current in said switching network means to proportionally bias each of said transistors on when said current in said switching network is in a direction of normal conduction of that transistor and to proportionally bias each of said transistors off when said current is in a direction opposite normal conduction of that transistor, and gate means connected in circuit with said current control means and in said base circuits of said transistors and controlled by said first and said second oscillators for rendering said current control means ineffective for a given transistor during existence of a signal from said oscillators biasing said given transistor off, thereby improving the efficiency of the system by controlling bias current to only that needed, as well as poviding protection for said transistors.

References Cited

UNITED STATES PATENTS 3,317,812  5/1967  Mesenhimer _____ 321—16
3,346,798  10/1967  Dinger _____ 321—18

(Other references on following page)

UNITED STATES PATENTS

| | | | |
|---|---|---|---|
| 3,002,142 | 9/1961 | Jensen | 321—9 |
| 3,010,062 | 11/1961 | Van Emden | 321—45 X |
| 3,060,363 | 10/1962 | Jensen | 321—45 X |
| 3,061,769 | 10/1962 | Smyth | 321—45 X |
| 3,189,813 | 6/1965 | Frierdich | 321—45 |
| 3,205,424 | 9/1965 | Bates | 321—18 |
| 3,278,827 | 10/1966 | Corey et al. | 321—44 |
| 3,233,161 | 2/1966 | Sikorra | 321—45 X |

LEE T. HIX, *Primary Examiner.*

W. SHOOP, *Assistant Examiner.*

U.S. Cl. X.R.

321—18